Figure 1:
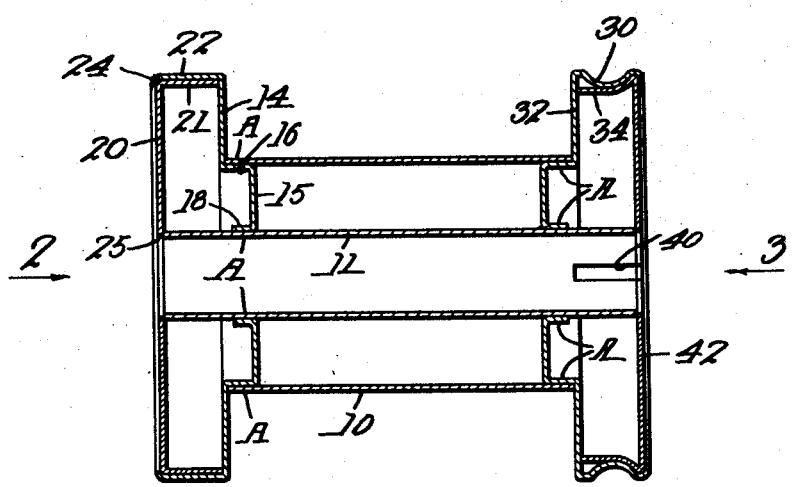

July 19, 1932.  J. E. GYOURKO  1,868,229

METAL SPOOL

Filed Nov. 8, 1930

Inventor
Joseph E. Gyourko
By Attorneys

Patented July 19, 1932

1,868,229

UNITED STATES PATENT OFFICE

JOSEPH E. GYOURKO, OF SHREWSBURY, MASSACHUSETTS, ASSIGNOR TO BOSTON PRESSED METAL COMPANY, OF WORCESTER, MASSACHUSETTS, A CORPORATION OF MAINE

METAL SPOOL

Application filed November 8, 1930. Serial No. 494,356.

This invention relates to a metal spool which is of general utility but which is particularly adapted for use in the wire industry.

It is the general object of my invention to provide a sheet metal spool of an improved construction, so designed that it may be easily and economically manufactured and that it will be strong and reliable in use.

My invention further relates to arrangements and combinations of parts which will be hereinafter described and more particularly pointed out in the appended claims.

A preferred form of the invention is shown in the drawing, in which

Fig. 1 is a sectional side elevation of my improved spool; and

Figures 2, 3:
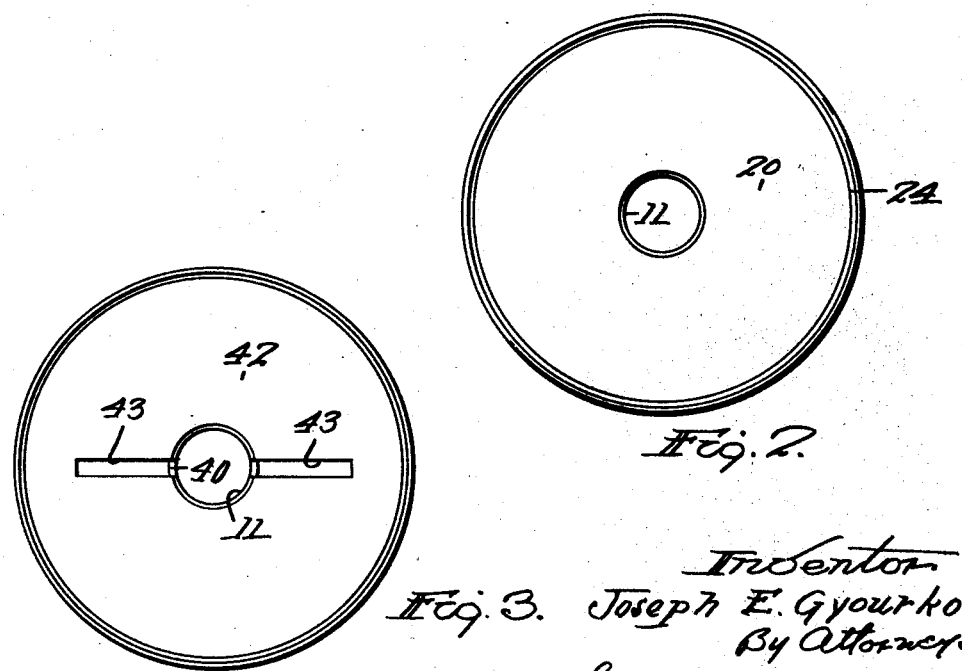

Figs. 2 and 3 are end views, looking in the directions of the arrows 2 and 3 in Fig. 1.

Referring to the drawing, my improved spool comprises a tubular sheet metal barrel 10, a tubular bearing member 11 and a pair of sheet metal heads. I will first describe the construction of the head shown at the left in Fig. 1.

This head comprises a disc 14 having an outwardly displaced portion 15 which provides an annular shoulder 16, closely fitting within one end of the tubular barrel 10. The displaced portion 15 is reversely offset at its middle portion to provide a sleeve 18, closely fitting the outside of the tubular bearing member 11.

A second disc 20 is provided with a peripheral flange 21 fitting within a corresponding flange 22 formed on the outer edge of the disc 14. The discs 14 and 20 are preferably secured in assembled relation by spinning the edge of the flange 22 inwardly over the periphery of the disc 20, as indicated at 24.

The disc 20 has a hole 25 at its center, aligned with the opening in the tubular bearing member 11. Preferably the inner edges of the disc 20 partially cover the end of the tube 11, as indicated in Fig. 1.

The head shown at the right in Fig. 1 is similar to the head previously described but the outer flange 30 of the disc 32 is contracted in its middle portion to form a peripheral groove, adapted to receive a rope or belt which might be used for frictionally resisting rotation of the spool. The grooving of the outer flange 30 necessitates a corresponding inward contraction of the inner flange 34, so that the parts may be assembled.

At the right hand end of the spool I have also shown provision for driving the spool. For this purpose the tubular bearing member 11 is provided with opposed slots 40, and the disc 42 is provided with radially extending slots 43, aligned with the slots 40. This permits the insertion of a driving shaft having a cross bar or cross-pin for engagement with the slots 40, whereby the spool may be rotated.

In assembling the spools, the tubes 10 and 11 are inserted in the discs 14 and 32 and are preferably secured therein by spot-welding at the points A. The discs 20 and 42 are then secured in place by the spinning operation previously described.

While I have shown the spool as having a plain head at one end and a grooved head at the other, it will be understood that spools may be manufactured within the scope of my invention in which both heads are plain or both heads are grooved and in which either or both heads are grooved and in which either or both ends of the spool may be provided with the slots 40 and 43.

While my improved spool is of general utility and is adapted to many different purposes by reason of its exceptionally strong and rigid construction, the spool possesses particular advantages in the wire industry, as wire wound thereon may be subjected to an annealing process while still on the spool and without rewinding, as has been the common practice heretofore. The rigid sheet metal construction enables the spool to withstand the annealing temperature without injury.

Having thus described my invention and the advantages thereof, I do not wish to be limited to the details herein disclosed, otherwise than as set forth in the claims, but what I claim is:—

1. A sheet metal spool comprising a tubular barrel, a tubular bearing member, and sheet metal heads each having a portion axially displaced to provide an annular shoulder closely fitting in an end of said tubular barrel, with said displaced portion inwardly offset at its center to provide an annular sleeve closely fitting over said tubular bearing member, each head being formed of inner and outer discs spaced apart and provided with overlapping concentric peripheral flanges, one of said outer discs having radially extended slots and the corresponding end portion of the tubular bearing member having longitudinally extended driving slots aligned with said radially extended slots in the associated outer end disc.

2. A sheet metal spool comprising a tubular barrel, a tubular bearing member, and sheet metal heads each formed of inner and outer discs held in spaced relation by overlapping peripheral flanges thereof, one of said discs having a central portion axially offset to provide an annular shoulder closely fitting in an end of said tubular barrel, one inner part of said offset portion being displaced axially in the opposite direction to provide an annular sleeve closely fitting over said tubular bearing member and extending toward the outer end thereof, said annular shoulder and said annular sleeve being disposed in the same radial section of said spool.

In testimony whereof I have hereunto affixed my signature.

JOSEPH E. GYOURKO.